United States Patent [19]

Cavanaugh, Jr.

[11] 3,784,404

[45] Jan. 8, 1974

[54] METHOD FOR PROTECTING PAINTED WORK-PIECES IN A BAKE OVEN

[75] Inventor: Robert E. Cavanaugh, Jr., Detroit, Mich.

[73] Assignee: Amchem Products, Inc., Ambler, Pa.

[22] Filed: Jan. 12, 1972

[21] Appl. No.: 217,219

[52] U.S. Cl............ 117/97, 117/95, 117/119.8, 117/119.6, 117/122 PS, 117/132 BS, 117/161 ZA
[51] Int. Cl............................ B44d 1/46, F26b 3/00
[58] Field of Search............ 117/132 BS, 161 ZA, 117/119.6, 97, 122 PS, 122 R, 95, 119.8; 34/81, 80, DIG. 1

[56] References Cited
UNITED STATES PATENTS

| | | | |
|---|---|---|---|
| 3,669,503 | 6/1972 | Zimmermann | 117/95 X |
| 3,196,027 | 7/1965 | White et al. | 117/132 BS X |
| 3,308,080 | 3/1967 | Haenni | 117/161 ZA X |
| 2,839,158 | 6/1958 | Reinauer | 117/161 ZA |
| 3,639,155 | 2/1972 | Hartlein et al. | 117/132 BS X |
| 2,537,433 | 1/1951 | Waring | 117/132 BS |
| 3,687,879 | 8/1972 | Vasta | 117/132 BS X |

FOREIGN PATENTS OR APPLICATIONS

| | | | |
|---|---|---|---|
| 1,042,215 | 9/1966 | Great Britain | 117/119.8 |

*Primary Examiner*—Ralph Husack
*Attorney*—Ernest G. Szoke et al.

[57] ABSTRACT

A polysiloxane oven coating for use in paint baking ovens to trap undesirable solid particulate matter and thereby prevent its deposition on the baking paint film. The coating can be employed effectively without causing paint defects in the finished paint film.

4 Claims, No Drawings

METHOD FOR PROTECTING PAINTED WORK-PIECES IN A BAKE OVEN

BACKGROUND OF THE INVENTION

The solid particulate matter ordinarily found suspended in paint bake ovens such as dust, lint, and rust particles, are carried into the oven by air currents, and deposit on the curing paint film. The deposit of these particles on the painted workpieces passing through the oven contributes to later paint defects and failure.

Attempts have been made to prevent the unwanted particulate matter from entering paint bake ovens. In most cases, these attempts have been mechanical in nature and have included, for example, filtering the incoming air entering the paint bake oven, maintaining a positive pressure in the oven to prevent the drawing in of unfiltered air, and covering both entrance and exit tunnels of the oven. These mechanical attempts have been successful to a small degree in reducing the amount of particulate matter in the ovens, but have not eliminated the problem created by the undesirable materials which enter the ovens despite the mechanical precautions.

Once the undesirable particles have entered the baking oven, the approach commonly employed is to attempt to trap the solid matter, thereby preventing its deposition on the fresh paint film. Numerous materials have been employed to coat oven walls and floors in an attempt to trap the particulate matter and keep it out of the circulating air stream in the oven, thereby preventing its deposition on the workpieces passing through the oven. Examples of the materials employed by the art are polyisobutylene, castor oil, and oxygenated petroleum hydrocarbons. Most materials proved unsuccessful or succeeded in only providing limited protection for short periods of time. Due to the temperature of the ovens during the drying and curing process, especially the baking temperatures employed in the processing of most acrylic finishes, the materials are either thermally degraded or volatilized and become completely ineffective. The high temperatures, usually exceeding 350°F, succeed in degrading the materials.

It is an object of this invention to provide an oven coating which will trap the solid particulate matter in paint bake ovens and prevent its deposition on the drying paint film.

It is also an object of this invention to provide a method for protecting the painted workpieces treated in paint bake ovens and prevent the deposition of undesirable particulate matter on the painted workpieces.

An additional object of this invention is to provide a coating composition to be administered to the walls and floors of paint bake ovens, said composition able to withstand bake temperatures exceeding 350°F without degradation and loss of effectiveness.

A concomitant object of the present invention is to provide an oven coating that can be incorporated in a ready to use formulation consisting of an anti-oxidant as well as solvents and thickener, in addition to the polysiloxane in order to make a compatible and useful mixture.

Additional objects of this invention will be apparent from the disclosure which follows.

DETAILED DESCRIPTION

This invention provides for a method for protecting painted workpieces by preventing the deposit of undesirable particulate matter on the workpieces during treatment in a paint bake oven, comprising applying to the oven surfaces an oven coating consisting of a polysiloxane represented by the formula:

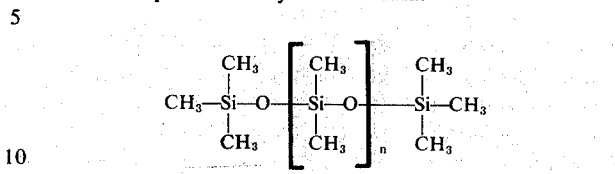

wherein $n$ is between 1,100 and 2,200. It will be appreciated that the polysiloxanes represented by the above formula and suitable for use in methods of the present invention are generally known compounds, which are readily obtainable commercially or by conventional synthesis methods well known to those skilled in the art.

The polysiloxane can be formulated with other constituents to form an oven coating composition containing polysiloxane, an anti-oxidant, a thickener, and such solvents as are necessary to produce a compatible mixture giving the desired results when employed in accordance with the method provided herein.

It will be appreciated that the oven coating composition of the present invention will have a viscous consistency. In the preferred embodiment of the present invention, the polysiloxane to be employed in the formulation should have a viscosity of from about 30,000 centistokes to about 100,000 centistokes when measured at a temperature of 25°C in accordance with A.S.T.M. Standard Method D-445. The polysiloxane must possess this high viscosity so that it can be applied on both horizontal and vertical surfaces and due to its heavy consistency will hold on such surfaces.

In order to formulate the oven coating composition, significant amounts of solvent and anti-oxidant will ordinarily be used. The polysiloxane should be present in an amount from about 10 percent to about 50 percent by weight.

The anti-oxidant is employed to inhibit thermal degradation of the polysiloxane. It has been found that incorporation of the anti-oxidant in the formulation can increase the useful life of the applied oven coating, compared to that of an uninhibited coating, at the temperatures normally encountered during use.

Typical examples of anti-oxidants suitable for use in the present invention are phenothiazine, phenyl-alphanaphthyl amine, N-stearoyl-p-aminophenol, N-lauroyl-p-aminophenol, trimethyl dihydroquinoline polymer, and diphenyl ethylene diamine. The anti-oxidant can be present in the oven coating composition in an amount from about 0.5 percent to about 2.0 percent by weight of the polysiloxane.

In preparing formulations in accordance with the present invention it has been found useful to rely upon certain solvents in order to provide a more easily handled and applied product, as well as to enhance the stability of the polysiloxane and anti-oxidant. Typical examples of the solvents which can be employed in the present invention are aliphatic hydrocarbons, aromatic hydrocarbons, and halogenated hydrocarbons. The solvents can be present in an amount from about 50 percent to about 90 percent by weight.

In order to hold the coating on vertical surfaces until the solvents evaporate, a thickener may be employed. A typical example of a suitable thickener is N-alkylgamma-hydroxy-butyramide. When a thickener is used, it will normally be present in an amount from about 0.05 percent to about 1.0 percent by weight. When N-alkyl-gamma-hydroxy-butyramide is used as a thickener, an ancillary benefit derived from its use is a reduction in the rate of corrosion of ferrous metal surfaces to which the coating is applied.

A surprising aspect of the present invention is that the composition employed herein, when applied to the appropriate portions of the baking ovens, does not contribute to any failure of the paint films being treated in the oven. No contamination of the paint film is evident and no paint defects can be observed. This is an important advantage of the present invention, since silicone-containing coatings ordinarily will contribute to such defects in the paint film due to the migration of the silicone to the painted workpiece. In fact, the art has specifically avoided the use of silicone-containing compositions.

The compositions of the present invention are used in accordance with well known practices in the art. An effective amount of the composition is applied to the walls and/or floor of the oven by any convenient method such as brush, roller coating, or spraying. The resulting coating, after evaporation of any solvents, provides a non-oxidizing film having a thickness from about 0.5 to 3 mils, which will remain soft and tacky, and will trap and hold airborne dirt particles, which otherwise might settle on the curing paint film. It has been found that the coating will maintain its stability and is able to withstand temperatures as high as 500°F for periods up to 6 months. In addition, the tendency of ferrous surfaces to rust due to the corrosive nature of the vapors from the drying paint will be significantly reduced.

Reference is now made to the following examples which set forth oven coating compositions and the method of the present invention, it being understood that such examples are presented for the purpose of illustration only and are not necessarily limiting upon the scope of the invention.

EXAMPLE I

An oven coating composition was prepared and contained the following:

|  | % by Weight |
|---|---|
| Dimethyl polysiloxane | 13.0 |
| Anti-oxidant | 0.2 |
| Naphtha | 86.8 |

The composition was prepared by dissolving the dimethyl polysiloxane in about an equal amount of VM+P naphtha, then blending in the anti-oxidant and mixing until completely uniform. This mixture was then added to the balance of the VM+P naphtha, and mixed to insure uniformity. The foregoing composition had a specific gravity of 0.774 at 60°F.

The foregoing formulation when applied to the floors of a paint bake oven resulted in a 20 percent reduction in paint defects, due to the prevention of depositing solid particulate matter on the painted surfaces, when compared to controls baked in the oven without the oven coating composition present.

EXAMPLE 2

The following oven coating composition was employed in this procedure:

|  | % by Weight |
|---|---|
| Dimethyl polysiloxane | 13 |
| Anti-oxidant | 0.2 |
| Naptha | 86.65 |
| Thickener (N-alkyl-gamma-hydroxy-butyramide) | .15 |

The composition was prepared by dissolving the dimethyl polysiloxane in about an equal weight of the VM+P naphtha, then blending in the anti-oxidant and mixing until completely uniform. This mixture was then added to the balance of the VM+P naphtha, and the resulting composition heated to 130°F. The previously melted thickener was then added, and the solution mixed until completely uniform. The composition had a specific gravity of 0.774 at 60°F.

The foregoing composition, when applied to the walls and floors of a paint bake oven resulted in a 20 percent reduction in paint defects when compared to controls baked in the oven without the oven coating composition present.

I claim:
1. A method for protecting painted workpieces from the deposition of undesirable particulate matter in a paint bake oven comprising applying to the oven surfaces a composition which remains soft and tacky during baking of the workpieces, said composition consisting essentially of a polysiloxane having the formula:

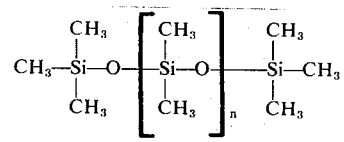

wherein $n$ is between 1,100 and 2,200.

2. The method of claim 1 wherein the composition additionally contains an effective amount of anti-oxidant.

3. The method of claim 1 wherein the composition additionally contains an effective amount of solvent which evaporates after application of the composition to the oven surfaces and during baking of the workpieces.

4. The method of claim 1 wherein the composition additionally contains an effective amount of thickener.

* * * * *